Dec. 8, 1931.  L. V. FOSTER  1,835,483

GOGGLE LENS

Filed March 15, 1929

Leon V. Foster.
INVENTOR

BY
ATTORNEY

Patented Dec. 8, 1931

1,835,483

UNITED STATES PATENT OFFICE

LEON V. FOSTER, OF IRONDEQUOIT, NEW YORK, ASSIGNOR TO BAUSCH & LOMB OPTICAL COMPANY, OF ROCHESTER, NEW YORK, A CORPORATION OF NEW YORK

GOGGLE LENS

Application filed March 15, 1929. Serial No. 347,349.

This invention relates to lenses and more particularly it has reference to lenses which are used in goggles that are worn by aviators, automobile drivers and the like.

The goggle lenses which have heretofore been quite widely used have been worn solely for the purpose of protecting the eyes from wind, dust particles and the like and have not been used to correct the refractive errors of an abnormal eye. The protective goggle lenses which are generally used are curved so as to conform approximately to the face of the wearer and, in order to insure a wide field of vision, the lens extends from the nose of the wearer to a point rearwardly of the external canthus of the eye so that the chord connecting the two ends of the average lens is about 80 millimeters long. Since it is neither practical nor convenient to wear corrective spectacle lenses between the eyes and the protective goggle lenses and since it is necessary for aviators and the like to wear goggles having a wide field of vision, the pursuits of aviation and the like have been largely restricted to persons having emmetropic or normal eyes.

If an attempt is made to provide such a curved goggle lens with a moderate dioptric power, of two or three diopters, for example, by grinding suitable curves on the two surfaces, the resulting lens will be either too short or of such excessive thickness and weight as to render it impractical.

One of the objects of the present invention is to provide a practical and efficient goggle lens which will provide a wide field of vision and have dioptric power for the correction of refractive errors of the eyes of the wearer. Another object is to provide a relatively long, curved goggle lens which is adapted to extend from the nose of the wearer to the external canthus of the eye and provide protection and refractive correction to the abnormal eyes of the wearer. These and other objects reside in certain novel features of construction, arrangement and combination of parts as will hereinafter be more fully explained and pointed out in the appended claims.

Referring to the drawings.

Figure 1:
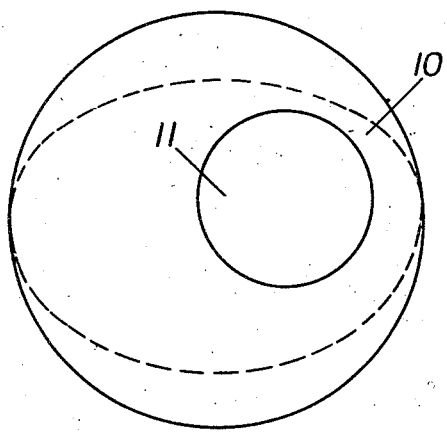
Fig. 1 shows a front view of a blank before the lens has been cut therefrom.
Figure 2:
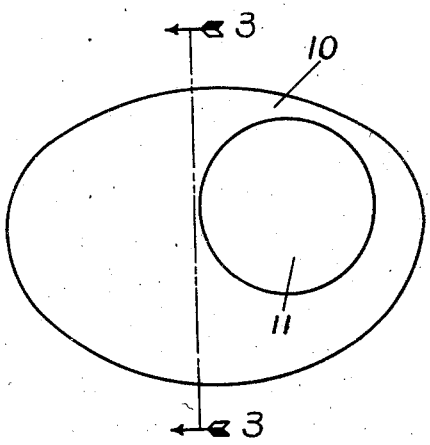
Fig. 2 shows a front view of the completed lens.

One embodiment of my invention is illustrated in the drawings wherein 10 indicates a major blank of suitable glass which may be provided with a spherical curve on the convex side and a spherical, cylindrical or toric curve on the concave side. A relatively large countersink is formed in the convex side of the blank 10 and a button or disk 11, having a higher refractive index than the blank 10, is then fused in the countersink. This composite lens is then ground and polished, after which the lens is cut on the dotted line indicated in Fig. 1 to provide the finished lens shown in Fig. 2.

Figure 4:
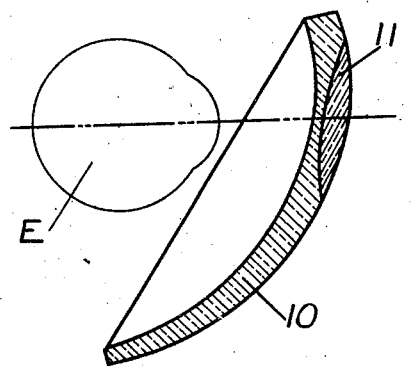
Fig. 4 shows a horizontal section of the lens in position before the right eye of a wearer.
Figure 3:
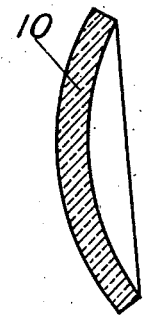
Fig. 3 shows a vertical section taken on line 3—3.

When the finished lens is placed before the eye E, as shown in Fig. 4, the large fused button 11 is brought substantially in front of the eye and provides the necessary dioptric power to correct the refractive error of the abnormal eye. The portions of the lens which are outside of the fused button area have substantially no dioptric power but merely provide protection like the ordinary goggle lens. The fused button area will provide clear, normal vision over a relatively large angle in front of the eye and although an abnormal eye will not be able to receive clear, sharp images through the other portions of the goggle lens, it will be able to perceive the existence of objects through such portions. It is, of course, more important that the eye be able to see distinctly and clearly towards the front rather than to be able to distinctly see objects by side glances. Hence, my improved goggle lens cannot be regarded, strictly, as a "bifocal lens," as that term is used in the art.

By way of illustration, one of my improved goggle lenses is 2.46 mm. thick at the nasal end and 1.9 mm. thick at the temporal end, the chord connecting these two ends being 80.0 mm. in length. The countersink in the major blank is 46.0 mm. in diameter and its radius of curvature is 128.5 mm. The convex side of the goggle is finished with a spherical curve whose radius is 63.3 mm. while a toric surface, whose radii of curvature are 64.61 mm. and 61.98 mm., is ground on the concave side of the lens. The optical center of the fused button 11 is 21.0 mm. from the nasal edge of the lens, so that when the lens is placed before the eye this optical center will be positioned substantially in front of the pupil of the eye. These dimensions provide a goggle lens having an area, adapted to be positioned in front of eye, whose dioptric power is represented as +1.50D+0.25D, axis 180° the other portions of the goggle lens having approximately no dioptric power.

It will be obvious to one skilled in the art that my improved goggle lens can be made to provide other dioptric powers than those given in the example in the preceding paragraph. It is also to be understood that various modifications can be made without departing from the spirit of the invention as pointed out in the appended claims.

I claim:

1. A goggle lens comprising a relatively long curved major blank of glass adapted to extend from the nose of the wearer to a point rearward of the external canthus of the eye, said blank having a countersink on one surface adjacent the nasal edge of the blank, a disk of glass fused in said countersink to provide an area having dioptric power, said disk having a higher refractive index than said blank, the portions of the lens outside of said area having substantially no dioptric power.

2. A goggle lens comprising a relatively long curved major blank of glass adapted to extend from the nose of the wearer to a point rearward of the external canthus of the eye, said blank having a countersink on one surface, a disk of glass fused in said countersink adjacent the nasal edge of the blank to provide an area having dioptric power adapted to correct the refractive error of the eye of the wearer, the refractive index of said disk being greater than that of the major blank, the portions of the lens outside of said area having substantially no dioptric power, the optical center of said area being positioned substantially in front of the pupil of the eye when the lens is worn.

3. A goggle lens comprising a relatively long curved major blank of glass adapted to extend from the nose of the wearer to a point rearward of the external canthus of the eye, said blank having a countersink formed adjacent to its nasal edge, a minor member fused in said countersink to provide an area having dioptric power adapted to correct the refractive error of the eye of the wearer, the refractive index of said minor member being greater than that of the major blank, the portions of said lens outside of said area having substantially no dioptric power, the optical center of said minor member being located between 15 and 30 millimeters from the nasal edge of the lens.

LEON V. FOSTER.